US008621413B1

(12) United States Patent
Xie (10) Patent No.: US 8,621,413 B1
(45) Date of Patent: Dec. 31, 2013

(54) SYSTEM, METHOD, AND COMPUTER PROGRAM PRODUCT FOR REDUCING A DEACTIVATION FUNCTION UTILIZING AN OPTIMAL REDUCTION

(75) Inventor: Aiguo Xie, San Jose, CA (US)

(73) Assignee: Calypto Design Systems, Inc., Santa Clara, CA (US)

( * ) Notice: Subject to any disclaimer, the term of this patent is extended or adjusted under 35 U.S.C. 154(b) by 599 days.

(21) Appl. No.: 12/723,539

(22) Filed: Mar. 12, 2010

(51) Int. Cl.
*G06F 17/50* (2006.01)

(52) U.S. Cl.
USPC ............ 716/132; 716/101; 716/104; 716/133

(58) Field of Classification Search
USPC .................................. 716/101, 104, 132, 133
See application file for complete search history.

(56) References Cited

U.S. PATENT DOCUMENTS

| | | | | |
|---|---|---|---|---|
| 4,689,494 | A * | 8/1987 | Chen et al. ..................... | 327/525 |
| 5,423,047 | A * | 6/1995 | Leak ............................. | 713/320 |
| 5,627,478 | A * | 5/1997 | Habersetzer et al. ......... | 324/750.3 |
| 5,699,317 | A * | 12/1997 | Sartore et al. ............. | 365/230.06 |
| 6,275,969 | B1 * | 8/2001 | Lakshminarayana et al. ............................ | 716/133 |
| 6,366,133 | B1 * | 4/2002 | Barnes .......................... | 326/121 |
| 6,546,536 | B1 * | 4/2003 | Nolan ............................ | 716/102 |
| 6,574,787 | B1 * | 6/2003 | Anderson ...................... | 716/103 |
| 7,865,748 | B2 * | 1/2011 | Lee et al. ....................... | 713/320 |
| 7,882,461 | B2 * | 2/2011 | Jiang et al. .................... | 716/132 |
| 7,930,673 | B2 * | 4/2011 | Jiang et al. .................... | 716/132 |
| 8,161,450 | B2 * | 4/2012 | Huynh et al. .................. | 716/137 |

OTHER PUBLICATIONS

Alidina et at. "Precomputation-based sequential logic optimization for low power," *IEEE Trans. on VLSI Systems*, 2(4): 246-346 (Dec. 1994).
Bahar et al., "Algebraic decision diagrams and their applications," *In Proc. International Conf. on Computer Aided Design*, pp. 188-191 (1993).
Benini et al., "Symbolic synthesis of clock-gating logic for power optimization of synchronous controllers," *ACM Trans. on Design Automation of Electronic Systems*, 4(4): 351-375 (Oct. 1999).
Bryant, "Graph-based algorithms for Boolean function manipulation," *IEEE Trans. on Computers*, 35(8): 677-691 (1986).
Dale, "Utilizing Clock-Gating Efficiency to Reduce Power," EE Times, 6 pages (Jan. 15, 2008).
Iyer, "Demystify power gating and stop leakage cold," EE Times, 3 pages (Mar. 3, 2006).
Smirnov, Automating advanced clock-gating techniques during high-level synthesis, http://www.soccentral.com/results.asp?entryID=30298 (Dec. 2009).

* cited by examiner

*Primary Examiner* — Sun Lin
(74) *Attorney, Agent, or Firm* — Klarquist Sparkman, LLP (57) ABSTRACT

A system, method and computer program product are provided for reducing a deactivation function utilizing an optimal reduction. In use, a deactivation function is identified. Additionally, reductions for the deactivation function are calculated. Further, an optimal reduction of the calculated reductions is determined. Moreover, the deactivation function is reduced, utilizing the optimal reduction.

31 Claims, 5 Drawing Sheets

SYSTEM, METHOD, AND COMPUTER PROGRAM PRODUCT FOR REDUCING A DEACTIVATION FUNCTION UTILIZING AN OPTIMAL REDUCTION

FIELD OF THE INVENTION

The present invention relates to logic circuits, and more particularly to logic circuit deactivation functions.

BACKGROUND

As the complexity and processing speed of logic circuits increase, they consume more power and hence more energy. As a result, managing the power consumption of logic circuits has become of significant importance. However, traditional techniques for managing logic circuit power consumption have generally exhibited various limitations.

For example, deactivation conditions of various components of a circuit may be determined, but there is a trade-off between the power reduction in the original circuit and the power consumption of the additional logic necessary to implement the deactivation condition. There is thus a need for addressing these and/or other issues associated with the prior art.

SUMMARY

A system, method and computer program product are provided for reducing a deactivation function utilizing an optimal reduction. In use, a deactivation function is identified. Additionally, reductions for the deactivation function are calculated. Further, an optimal reduction of the calculated reductions is determined. Moreover, the deactivation function is reduced, utilizing the optimal reduction.

DETAILED DESCRIPTION

Figure 1:
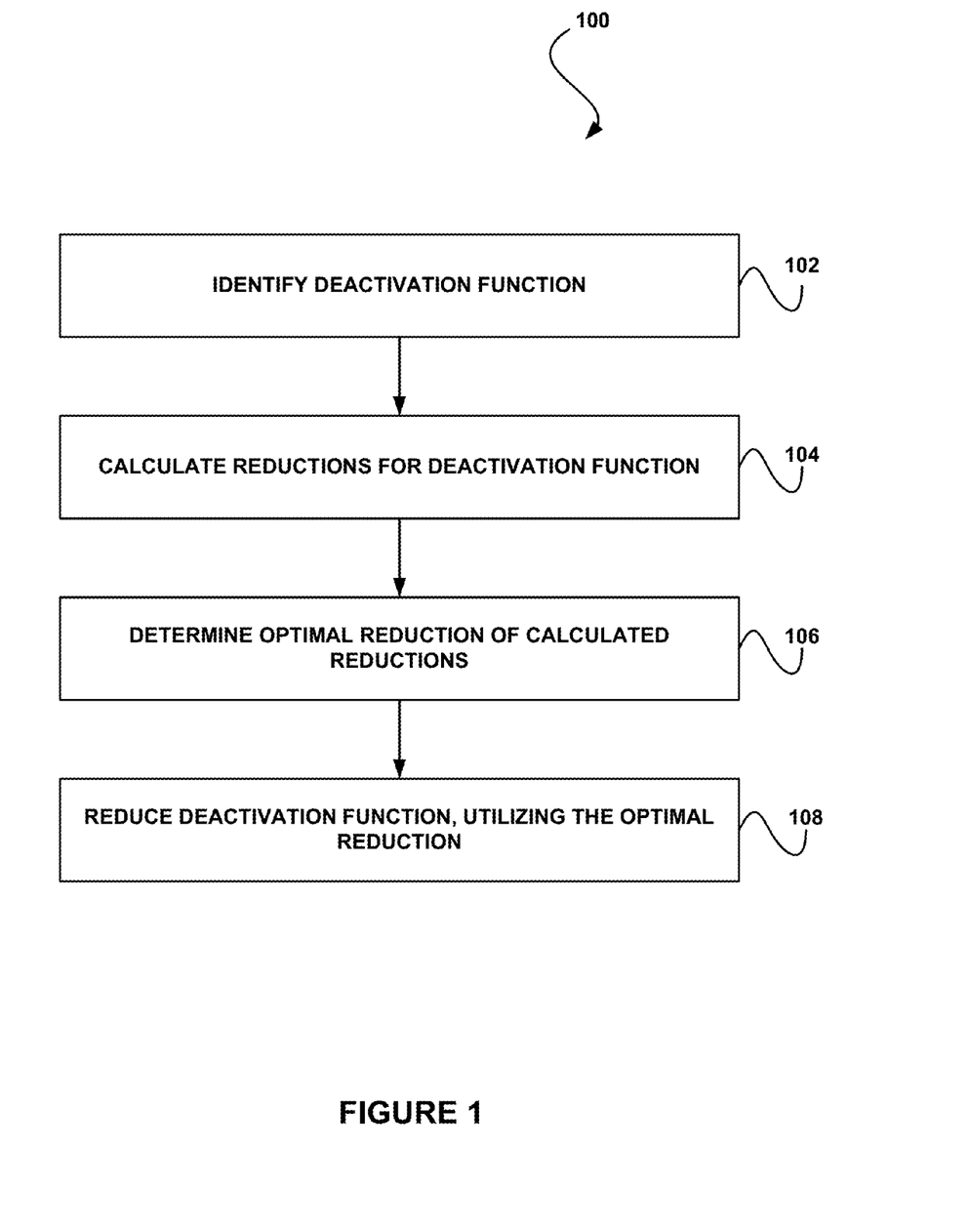
FIG. 1 shows a method for reducing a deactivation function utilizing an optimal reduction, in accordance with one embodiment.

FIG. 1 shows a method 100 for reducing a deactivation function utilizing an optimal reduction, in accordance with one embodiment. As shown in operation 102, a deactivation function is identified. In the context of the present description, the deactivation function may include any function related to the activation or deactivation of a component (e.g., a hardware component, deactivation circuit, etc.) For example, the deactivation function may include a logic function that represents one or more hardware elements that perform the activation or deactivation of the component.

In one embodiment, the deactivation function may be a decomposition of another deactivation function. For example, a large and/or complex deactivation function may be rewritten, decomposed, etc. into a smaller deactivation function. In another embodiment, the deactivation function may include one or more variables. For example, the variables may represent one or more inputs of the deactivation function. In another example, the variables may represent one or more support functions. For instance, the smaller deactivation function may include one or more variables that represent support functions of the large and/or complex deactivation function.

As also shown, reductions are calculated for the deactivation function. Note operation 104. In the context of the present description, the reductions calculated for the deactivation function may reduce or simplify the deactivation function in any manner. In one embodiment, a reduction for the deactivation function may eliminate one or more variables from the deactivation function. In another embodiment, the reductions of the deactivation function may be calculated with respect to each of the variables. For example, the reductions of the deactivation function include a positive Shannon reduction, a negative Shannon reduction, a universal quantification for the deactivation function with respect to each of the variables, etc.

In one embodiment, a positive and negative co-factor of the deactivation function may be calculated with respect to each of the variables of the deactivation function. In another embodiment, the positive Shannon reduction for the deactivation function with respect to a particular variable may be determined utilizing the particular variable and the positive co-factor of the deactivation function with respect to the particular variable. For example, the positive Shannon reduction with respect to a variable may include the conjunction of the variable with the positive co-factor of the deactivation function with respect to the variable.

In yet another embodiment, the negative Shannon reduction for the deactivation function with respect to a particular variable may be determined utilizing a negation of the particular variable and the negative co-factor of the deactivation function with respect to the particular variable. For example, the negative Shannon reduction with respect to a variable may include the conjunction of the negation of the variable with the negative co-factor of the deactivation function with respect to the variable.

In still another embodiment, the universal quantification for the deactivation function with respect to a particular variable may be determined utilizing the positive co-factor of the deactivation function with respect to the particular variable and the negative co-factor of the deactivation function with respect to the particular variable. For example, the universal quantification with respect to a variable may include the conjunction of the positive co-factor of the deactivation function with respect to the variable and the negative co-factor of the deactivation function with respect to the variable.

In yet another embodiment, variable reductions may be calculated for each of the variables of the deactivation function. For example, the one or more variables of the deactivation function may each represent a support function, and a positive Shannon reduction, a negative Shannon reduction, and a universal quantification may be calculated for each support function in view of the deactivation function. Additionally, another optimal reduction of the variable reductions may be determined for each of the variables. In one embodiment, the other optimal reduction for each of the variables may be used in calculating reductions for the deactivation function. In this way, a large or complex deactivation function may be decomposed into a deactivation function that includes support functions that can be hierarchically and recursively reduced until the most efficient reduction is determined.

Further, as shown in operation 106, an optimal reduction of the calculated reductions is determined. For example, one of the calculated reductions may be selected as the optimal reduction. In one embodiment, a probability may be determined with respect to each of the calculated reductions. For example, a probability that each of the calculated reductions evaluates to TRUE may be determined. Additionally, in another embodiment, an amount of overhead may be determined with respect to each of the calculated reductions. For example, a number of basic Boolean operations may be determined for each calculated reduction. Further, the probability and overhead of each calculated reduction may be analyzed in order to determine the optimal reduction. For example, the calculated reduction with the highest probability and the lowest overhead may be determined to be the optimal reduction of the calculated reductions. In another embodiment, additional factors may be considered in order to determine the optimal reductions. For example, factors such as details of a target module that utilizes the deactivation function and technology data for a logic implementation of the deactivation function may be considered in order to determine the optimal reductions.

Further still, as shown in operation 108, the deactivation function is reduced, utilizing the optimal reduction. In the context of the present description, the reduced deactivation function may include any reduction or simplification of the deactivation function. In one embodiment, the optimal reduction may be substituted for the deactivation function. Of course, however, the deactivation function may be reduced utilizing the optimal reduction in any manner.

In another embodiment, additional reductions may be calculated for the reduced deactivation function. For example, a positive Shannon reduction, a negative Shannon reduction, and a universal quantification may be calculated for the reduced deactivation function with respect to each variable of the reduced deactivation function. Additionally, another optimal reduction of the additional reductions may be determined, and the reduced deactivation function may be further reduced, utilizing the other optimal reduction of the additional reductions. In this way, the deactivation function may be iteratively reduced until the most efficient reduction is determined.

In view of the above, the deactivation function may be reduced while accounting for power savings of the deactivation function as well as an implementation cost of the deactivation function, where the implementation cost may include one or more of power overhead, area overhead, and speed overhead of a circuit implementing the deactivation function.

Figure 2:
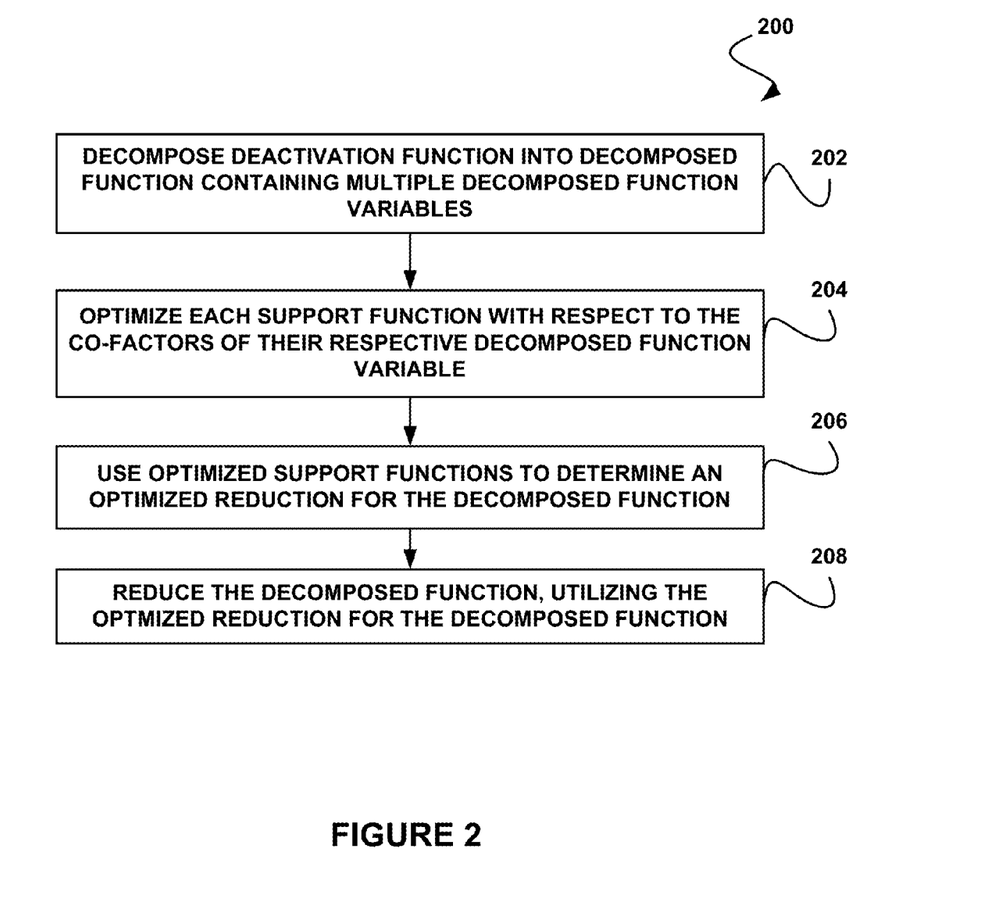
FIG. 2 shows a method for hierarchically reducing a deactivation function, in accordance with another embodiment.

FIG. 2 shows a method 200 for hierarchically reducing a deactivation function, in accordance with one embodiment. As an option, the method 200 may be carried out in the context of the details of FIG. 1. Of course, however, the method 200 may be carried out in any desired environment. Further, the aforementioned definitions may equally apply to the description below.

As shown in operation 202, a deactivation function is decomposed into a decomposed function containing multiple decomposed function variables. For example, a deactivation function may be rewritten as a decomposed function containing multiple decomposed function variables, where each decomposed function variable represents a support function of the decomposed function, and each support function includes one or more support function variables. Additionally, co-factors of the decomposed function may be calculated with respect to each of the decomposed function variables.

Additionally, as shown in operation 204, each of the support functions is optimized with respect to the co-factors of their respective decomposed function variable. For example, a positive Shannon reduction, a negative Shannon reduction, and a universal quantification may be calculated for the support function variables of each support function as well as the negation of each support function. In addition, an optimal reduction of each support function as well as an optimal reduction of the negation of each support function may be determined.

Further, as shown in operation 206, the optimized support functions are used to determine an optimized reduction for the decomposed function. For example, the optimal reduction of each support function and the optimal reduction of the negation of each support function may be used in conjunction with the co-factors of the decomposed function to determine the positive Shannon reduction, negative Shannon reduction, and universal quantification for the decomposed function with respect to each decomposed function variable. For example, the positive Shannon reduction for the decomposed function with respect to a particular decomposed function variable may be determined utilizing the optimal reduction of the support function and the positive co-factor of the decomposed function with respect to the particular decomposed function variable representing the support function.

Additionally, the negative Shannon reduction for the decomposed function with respect to a particular decomposed function variable may be determined utilizing the optimal reduction of the negation of the support function and the negative co-factor of the decomposed function with respect to the particular decomposed function variable representing the support function. Further, the universal quantification for the deactivation function with respect to a particular decomposed function variable may be determined utilizing the positive co-factor of the decomposed function with respect to the particular decomposed function variable and the negative co-factor of the decomposed function with respect to the particular decomposed function variable. In addition, the optimal reduction of the calculated reductions for the decomposed function may then be determined, and the decomposed function may then be reduced.

Further, as shown in operation 208, the decomposed function is reduced, utilizing the optimized reduction for the decomposed function. In this way, a legal reduction of the deactivation function is yielded.

It should also be noted that the above method may operate in a recursive manner. For example, each support function may itself represent an additional decomposed function, and each support function variable may in turn represent an additional support function of the additional decomposed function. Therefore, in one embodiment, each of the additional support functions may be optimized with respect to the co-factors of their respective support function variable, the optimal reduction for the support function may be determined, and the support function may then be reduced.

Further, since the specific effect of the decomposed function is accounted for when estimating the power saving gain for each support function, the decomposed function is not required to be positive unate, which therefore avoids any functionally incorrect reductions. Also, deactivation logic of any size may be efficiently decomposed and optimized in this manner.

Figure 3:
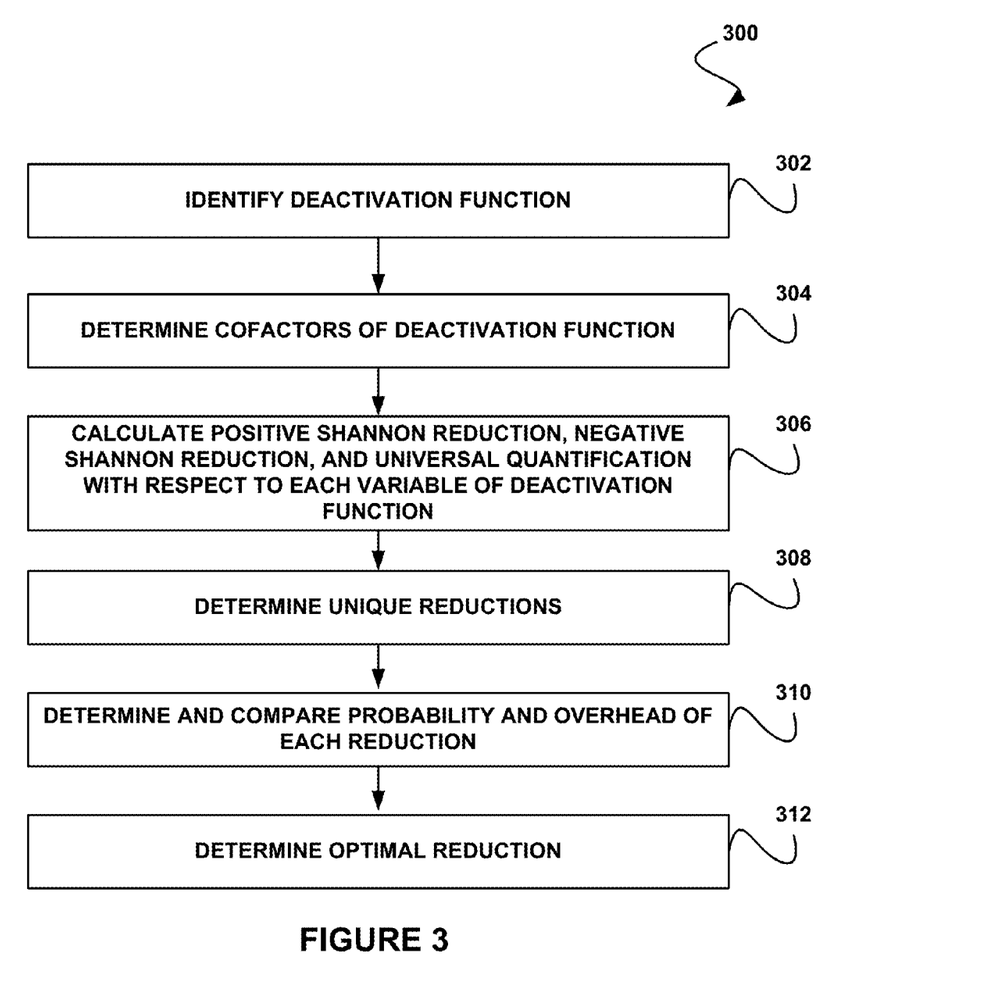
FIG. 3 shows a method for optimizing a deactivation function, in accordance with yet another embodiment.

FIG. 3 shows a method 300 for optimizing a deactivation function, in accordance with another embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a deactivation function including multiple variables is identified. For example, an identified deactivation function D may be represented as D(a, b, c)="a & b|~a & c," where D is a deactivation function and where a, b, and c are independent variables representing Boolean values.

Additionally, as shown in operation 304, the cofactors of the deactivation function with respect to (w.r.t.) the individual variables are determined. For example, given the deactivation function D above, Table 1 illustrates the cofactors of D with respect to a, b, and c. It should be noted that the cofactors presented in Table 1 are set forth for illustrative purposes only, and thus should not be construed as limiting in any manner.

TABLE 1

| |
|---|
| D_a = b |
| D_a' = c |
| D_b = a \| ~a & c = a \| c |
| D_b' = ~a & c |
| D_c = a & b \| ~a = b \| ~a |
| D_c' = a & b |

Further, as shown in operation 306, a positive Shannon reduction, negative Shannon reduction, and universal quantification are calculated with respect to each variable of the deactivation function. More specifically, to analyze the power of a circuit, it is necessary to obtain the switching activities (SA) of relevant signals of the circuit. Additionally, a function may be decomposable into Shannon reductions and that each of these reductions can be more efficient than others based on related signal SA values. According to Shannon Decomposition Theorem, a deactivation function $D(x\_1, \ldots, x\_n)$ can be written as: $D=(x\_i \& D\_x\_i)|(x\_i' \& D\_x\_i')$, where for any variable $x\_i$ ($i=1, \ldots, n$), $D\_x\_i$ and $D\_x\_i'$ are the cofactors of D, respectively, i.e. $D\_x\_i=D(x\_1, \ldots, x\_n|x\_i=1)$, and $D\_x\_i'=D(x\_1, \ldots, x\_n|x\_i=0)$.

Additionally, terms $x\_i \& D\_x\_i$ and $x\_i' \& D\_x\_i'$ may be mutually exclusive. Depending on the probabilities of $x\_i$, $D\_x\_i$ and $D\_x\_i'$ and the costs of implementing $D\_x\_i$ and $D\_x\_i'$, either of the terms may be a more efficient reduction of D. Similarly, depending on the probabilities and the cost of its implementation, the conjuction of the factors $D\_x\_i \& D\_x\_i'$ may be a more efficient candidate for power saving than the above two terms, and vice versa. As such, the positive Shannon reduction is $x\_i \& D\_x\_i$, the negative Shannon reduction is $x\_i' \& D\_x\_i'$, and the universal quantification is $D\_x\_i \& D\_x\_i$.

For example, given the deactivation function D above, Table 2 illustrates positive Shannon reduction, negative Shannon reduction, and universal quantification of D with respect to a, b, and c. It should be noted that the reductions presented in Table 2 are set forth for illustrative purposes only, and thus should not be construed as limiting in any manner.

TABLE 2

| | |
|---|---|
| Positive Shannon reduction w.r.t. variable a, denoted by h[a, 0]: | h[a, 0] = a & D_a = a & b |
| Negative Shannon reduction w.r.t. variable a, denoted by h[a, 1]: | h[a, 1] = ~a & D_a' = ~a & c |
| Universal Quantification w.r.t. variable a, denoted by h[a, 2]: | h[a, 2] = D_a & D_a' = b & c |
| Positive Shannon reduction w.r.t. variable b denoted by h[b, 0]: | h[b, 0] = b & D_b = b & (a \| c) |
| Negative Shannon reduction w.r.t. variable b, denoted by h[b, 1]: | h[b, 1] = ~b & D_b' = ~b & (~a & c) |
| Universal Quantification w.r.t. variable b, denoted by h[b, 2]: | h[b, 2] = D_b & D_b' = (a \| c) & (~a & c) = ~a & c |
| Positive Shannon reduction w.r.t. variable c, denoted by h[c, 0]: | h[c, 0] = c & D_c = c & (b \| ~a) |
| Negative Shannon reduction w.r.t. variable c, denoted by h[c, 1]: | h[c, 1] = ~c & D_c' = ~c & (a & b) |
| Universal Quantification w.r.t. variable c, denoted by h[c, 2]: | h[c, 2] = D_c & D_c' = (b \| ~a) & (a & b) = a & b |

Further, as shown in operation 308, all unique reductions are determined. For example, Since h[a, 1]=h[b, 2]=~a & c and h[a, 0]=h[c, 2]=a & b, we consider (9−2)=7 unique reductions. Further still, in operation 310, the probability and overhead of each reduction is determined and compared. In the context of the current embodiment, any determination of probability or overhead may be used. For example, Pr(y) may be used to denote the probability for a logic function y to evaluate to TRUE. In another example, Pr(~y)=1−Pr(y). Additionally, the probability for a reduction may directly relate to the power savings of a target module if the reduction were to be applied to de-activate the target module. In one embodiment, in order to determine overhead, a number of basic Boolean operations (i.e., AND's and OR's) that each reduction has may be calculated. In another embodiment, negation operation counts may be ignored as negations may be largely eliminated through logic transformations and technology mapping. Additionally, more detailed quality measures such as power consumption overhead and net power saving for the reductions may be considered.

In one example, all variables a, b, and c may have a probability of 0.9. That is, they are TRUE for a chance of 90% (or FALSE 10%). Given that, the original deactivation function D has a probability of 0.9. Additionally, the deactivation function D performs 2 AND and 1 OR operations. Further, Table 3 illustrates exemplary probabilities and overheads for each unique reduction. Again, it should be noted that the probabilities and overheads presented in Table 3 are set forth for illustrative purposes only, and thus should not be construed as limiting in any manner.

TABLE 3

| Reduction | Probability | # ANDs | # ORs |
|---|---|---|---|
| h[a, 0] | 0.81 | 1 | 0 |
| h[a, 1] | 0.09 | 1 | 0 |
| h[a, 2] | 0.81 | 1 | 0 |
| h[b, 0] | 0.891 | 1 | 1 |
| h[b, 1] | 0.009 | 2 | 0 |
| h[c, 0] | 0.819 | 1 | 1 |
| h[c, 1] | 0.081 | 2 | 0 |

As shown in the above exemplary table, h[a, 1] is inferior to h[a, 0] because it has a smaller probability than h[a, 0] but the same amount of basic Boolean operations. Similarly, h[b, 1] and h[c, 1] are inferior to h[a, 0], whereas h[c, 0] is inferior to h[b, 0]. Also h[a, 2] has the same probability and operation amount as h[a, 0]. Therefore, 2 out of the 7 unique reductions may be found to be non-inferior, as listed in Table 4 below. Again, it should be noted that the probabilities and overheads presented in Table 4 are set forth for illustrative purposes only, and thus should not be construed as limiting in any manner.

TABLE 4

| Reduction | Probability | # ANDs | # ORs |
|---|---|---|---|
| h[a, 0] | 0.81 | 1 | 0 |
| h[b, 0] | 0.891 | 1 | 1 |

In addition, as shown in operation 312, an optimal reduction may be determined. For example, the reductions in Table 4 above may be compared with the original deactivation function D, and may be determined to be noninferior to D since they have a lower operational cost even though their probabilities are smaller than that of D. More specifically, reduction h[a, 0] has (0.9−0.81)/0.9=10% less in probability but 1 fewer AND and 1 fewer OR operation than D. The other non-inferior reduction h[b, 0] has (0.9−0.891)/0.9=1% less in probability but 1 fewer AND operation that D. In one embodiment, depending on further details of the target module and the technology data for logic implementation, any one of the three (i.e., the original deactivation function D, reduction h[a, 0] or reduction h[b, 0]) could be the most efficient in terms of the net power savings.

In this way, the present method yields non-inferior reductions that are not available using other optimization functions. Additionally, it should be noted that the above analysis may correspond to applying a reduction process for only one iteration, and that the reduction process can again be applied for more iterations until there is no more improvement. For instance, after the first iteration, based on more detailed data inputs such as the target module, if it is determined that D is the most efficient, then no further iteration is necessary.

However, in another example, if h[a, 0]=a & b is the most efficient from the first iteration, it may then be denoted as a new deactivation function D1. Since D1=h[a, 0] is a reduction of D with respect to variable a in the first iteration, there may be no need to further reduce it with respect to variable a in the new iteration. Other than variable a, D1 has only one more variable b. Therefore, reductions of D1 only with respect to variable b may be considered.

Additionally, the cofactors of the new deactivation function D1 with respect to the remaining individual variables may be determined. For example, given the deactivation function D1 above, Table 5 illustrates the cofactors of D1 with respect to b. It should be noted that the cofactors presented in Table 5 are set forth for illustrative purposes only, and thus should not be construed as limiting in any manner.

TABLE 5

D_b = 1
D_b' = 0

Further, a positive Shannon reduction, negative Shannon reduction, and universal quantification are calculated with respect to each variable of the new deactivation function. For example, given the deactivation function D1 above, Table 6 illustrates positive Shannon reduction, negative Shannon reduction, and universal quantification of D1 with respect to b. It should be noted that the reductions presented in Table 6 are set forth for illustrative purposes only, and thus should not be construed as limiting in any manner.

TABLE 6

| | |
|---|---|
| Positive Shannon reduction w.r.t. variable b, denoted by h[b, 0] (D1): | h[b, 0](D1) = b & D1_b = b & a |
| Negative Shannon reduction w.r.t. variable b, denoted by h[b, 1] (D1): | h[b, 1](D1) = ~b & D1_b' = ~b & 0 = 0 |
| Universal Quantification w.r.t. variable b, denoted by h[b, 2] (D1): | h[b, 2](D1) = D1_b & D1_b' = a & 0 = 0 |

In the current embodiment, since h[b, 0](D1)=b & a equals to D1 itself, 1 unique proper reduction is determined, i.e., 0. Depending on more detailed data such as those of the target module, reducing D1 to 0 may be determined to be an optimal result. In either case, no further reduction is possible.

Table 7 illustrates an iterative reduction of the deactivation function D until an optimal reduction is found. It should be noted that the iterative reduction presented in Table 7 is set forth for illustrative purposes only, and thus should not be construed as limiting in any manner.

TABLE 7

```
Procedure OPTIMIZE_BASIC
  Input:
    A circuit C;
    A component M of C;
    A legal deactivation function D(X) for M;
    Relevant signal SA values of C.
  Output:
    A deactivation function D* of M which is a sub-function of D that
    minimizes the power consumption of C.
Line
 1  Let D* := D;
 2  Let P* := Pow(C + D*);
 3  Let P*_prev := +Infinity;
 4  Let Z := X;
 5  repeat until Z is empty or P* < P*_prev
 6  begin
 7     Let P*_prev := P*;
 8     Let z_1, ..., z_m be all Boolean variables in Z;
 9     for i = 1, ..., m
10     begin
11        for j = 1, ..., 3
12        begin
13           Compute j-th Shannon component of D* w.r.t. z_i, denoted
             by h[i,j];
14           if {Pow(C + h[i,j]) < P*}
15           begin
16              P* :=Pow(C + h[i,j]);
17              D* := h[i,j];
18              z* := z_i;
19           end
20        end
21     end
22     if {P* < P*_prev}
23     begin
24        Remove z* from Z;
25        Remove all variables from Z that are not essential supports of D*;
26     end
27  end
28  return D*;
```

In one example, the above procedure may be iterative. Variable D* may store the current most efficient deactivation function, and may be assigned the input deactivation function D initially. Variable P* may store the current most efficient design power, which is computed as the power of circuit C if D* is applied. Variable P*_prev may store the most efficient design power from the previous iteration, and may be assigned the positive infinite value initially. Variable Z may be the set of the support variables of D* whose Shannon reductions have not been considered as optimal in the previous iterations. For example, it may be set as X, the set of all support variables of D initially.

After the initialization steps (lines 1 to 4), the procedure may iterate between line 6 and 27 until either set Z is empty or the design power stops decreasing, i.e., P* is not smaller than P*_prev. When the iteration terminates, D* is the optimal deactivation function and returned.

At the beginning of each iteration, the previous most efficient designed power may be updated (line 7). The rest of the iteration may compute all Shannon reductions (as described earlier) for the current most efficient deactivation function D* with respect to each of the m variables z_1 through z_m in set Z. This may be accomplished by the for loops (lines 9 to 13). The design power corresponding to each Shannon reduction may be computed and compared with the current most efficient design power (line 14). If it is better, the current most efficient design power P* and the most efficient deactivation function D* may be updated (lines 16 to 17) whereas z* may store the corresponding variable (line 18). After that, should the designed power reduces (line 22), the variable z* corresponding to the most efficient Shannon reduction may be removed from set Z (line 24) so that it will no longer participate in Shannon reduction computation in future iterations. Additionally, any variable in Z that is not an essential support of the newly found most efficient deactivation function D* may be removed from Z (line 25).

In another embodiment, various variations of the above procedure may be possible. For example, the stopping criterion for the iteration (line 5) may be modified to limit the number of iterations and/or the accumulated runtime. In another example, beside the sole design power, the criterion of an alternate Shannon reduction (line 14 and related design metric calculation) may incorporate design metrics such as their area and timing overhead for the design. For instance, a Shannon component may be more efficient if it has smaller area and/or timing overhead even if its total design power is the same as another component in comparison.

In another example, symbolic techniques such as binary decision diagrams (BDDs) may be used for more efficient representation and computations of deactivation functions and their Shannon reductions. Further, in yet another example, symbolic techniques such as algebraic decision diagrams (ADDs) may be used to estimate switching activity values for circuit signals and their functions.

Figure 4:
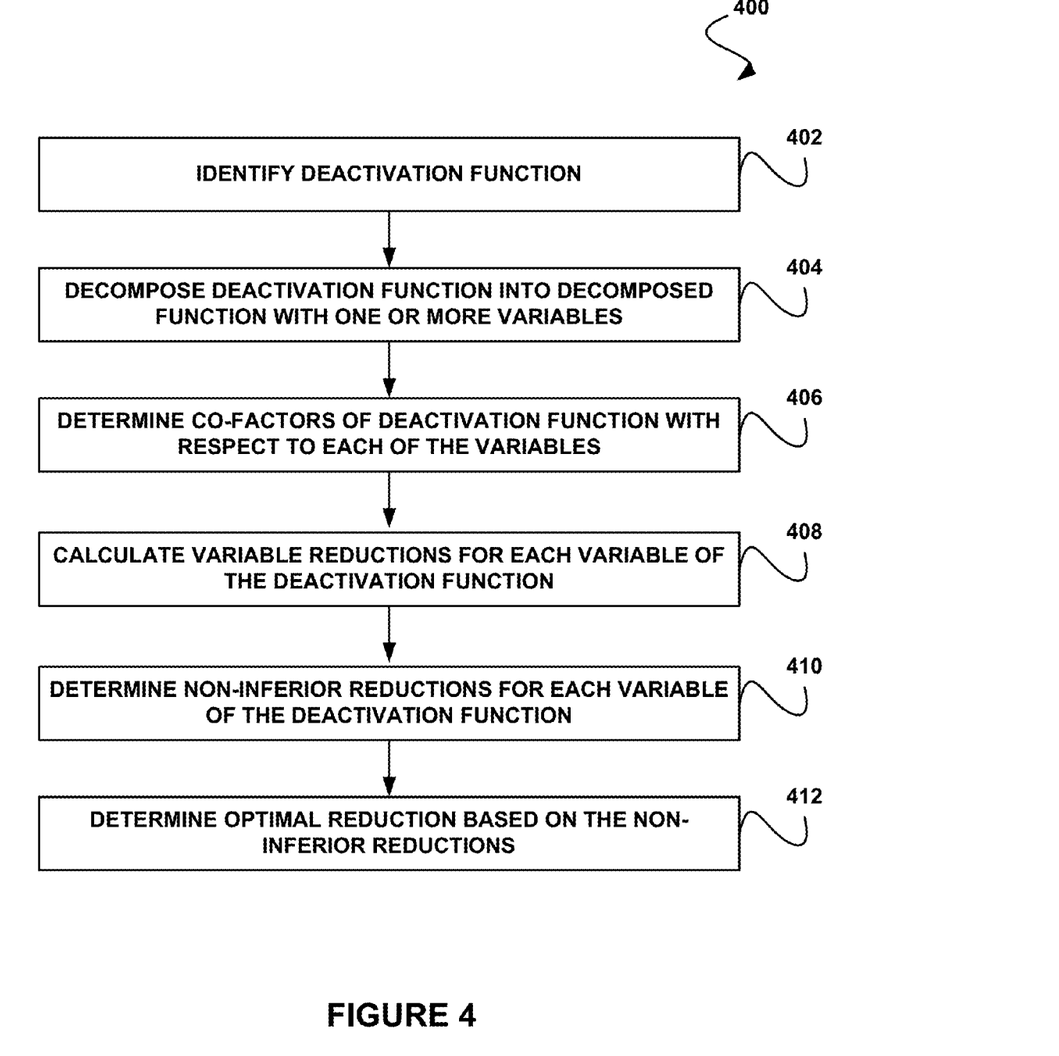
FIG. 4 shows a method for hierarchically optimizing a deactivation function, in accordance with still another embodiment.

FIG. 4 shows a method 400 for hierarchically optimizing a deactivation function, in accordance with another embodiment. As an option, the method 400 may be carried out in the context of the details of FIGS. 1-3. Of course, however, the method 400 may be carried out in any desired environment. Further, the aforementioned definitions may equally apply to the description below.

As shown in operation 402, a deactivation function is identified. For example, an identified deactivation function D may be represented as $D(a1, a2, a3, b1, b2, c1, c2)=$"$(((a1|a2)$ & $a3)$ & $(b1$ & $b2))|(\sim((a1|a2)$ & $a3)$ & $(c1|c2))$," where D is a deactivation function and where a1, a2, a3, b, c1 and c2 are independent Boolean variables.

Additionally, in operation 404, the deactivation function is decomposed into a decomposed function with one or more variables. For example, the above deactivation function D may be decomposed and rewritten as $D=D1(a, b, c)$ o $(a==(a1|a2)$ & $a3)$ o $(b==(b1$ & $b2)$ o $(c==(c1|c2))$, where $D1(a, b, c)=$"a & b|~a & c". Table 8 illustrates the decomposed deactivation function D. It should be noted that the decomposition of the deactivation function presented in Table 8 is set forth for illustrative purposes only, and thus should not be construed as limiting in any manner.

TABLE 8

X = {a1, a2, a3, b1, b2, c1, c2},
Y = {a, b, c},
F_1(X) = (a1 | a2) & a3,
F_2(X) = b1 & b2,
F_3(X) = c1 | c2,
D1(Y) = a & b | ~a & c,
D(X) = D1(Y) o (a == F_1(X)) o (b == F_2(X)) o (c == F_3(X))

As shown in Table 8, D1 is a level-1 function and a, b, and c are level-1 variables of D1, where a, b, and c represent F_1, F_2 and F_3 respectively, and where F_1, F_2 and F_3 are level-2 functions. In this way, all the lower level functions D1, F_1, F_2 and F_3 may be simpler than D, and instead of optimizing D directly, F_1, F_2 and F_3 may be optimized in view of D1 and the results may be combined.

Further, as shown in operation 406, the co-factors of the deactivation function are determined with respect to each of the variables. For example, Table 9 illustrates the co-factors of the level-1 function D1 as with respect to each of the level-1 variables in Y. It should be noted that the co-factors presented in Table 9 is set forth for illustrative purposes only, and thus should not be construed as limiting in any manner.

TABLE 9

D1_a = b,
D1_a' = c,
D1_b = a | c,
D1_b' = ~a & c,
D1_c = b | ~a,
D1_c' = a & b.

Further still, as shown in operation 408, variable reductions are calculated for each variable of the deactivation function. For example, each of the level-2 functions may be optimized in the perspective of their respective cofactors of the level-1 functions computed above. More specifically, for each level-2 function F_i, we consider 2 optimal reductions of it: F*_i: an optimal reduction of F_i when composed with the cofactor D1_i as a reduction of D, and F*_i': an optimal reduction of ~F_i when composed with the cofactor D1_i' as a reduction of D.

In one embodiment, the level-2 function F_1 may be addressed first. Recall that F_1(X)=(a1|a2) & a3. To obtain the above optimal reductions for it, a positive Shannon reduction, a negative Shannon reduction, and a universal quantification may be determined for F_1. More specifically, the positive Shannon reduction may optimize F_1(X)=(a1|a2) & a3, in the perspective of the positive level-1 cofactor D1_a=b. Additionally, the negative Shannon reduction may optimize ~F_1(X)=~((a1|a2) & a3), in the perspective of the negative level-1 cofactor D1_a'=c.

For the purposes of the current embodiment, we may assume all inputs of the deactivation function D are independent and their signal probabilities are as presented in Table 10. It should be noted that the probabilities of the inputs presented in Table 10 is set forth for illustrative purposes only, and thus should not be construed as limiting in any manner.

TABLE 10

Pr(a1) = 0.5,
Pr(a2) = 0.5,
Pr(a3) = 0.1,
Pr(b1) = 0.2,
Pr(b2) = 0.5,
Pr(c1) = 0.5,
Pr(c2) = 0.8.

In one embodiment, F_1(X) may itself be further optimized hierarchically. Here, let us assume it need not be further optimized. In the current embodiment, F_1(X) has 3 variables a1, a2 and a3. In one example, we may consider 3*3=9 reductions of F_1(X) as summarized in Table 11 below. It should be noted that the iterative reduction presented in Table 11 is set forth for illustrative purposes only, and thus should not be construed as limiting in any manner.

TABLE 11

| Reduction | Probability | # ANDs | # ORs |
|---|---|---|---|
| h[a1, 0] = a1 & a3 | 0.05 | 1 | 0 |
| h[a1, 1] = ~a1 & a2 & a3 | 0.025 | 2 | 0 |
| h[a1, 2] = a2 & a3 | 0.05 | 1 | 0 |
| h[a2, 0] = a2 & a3 | 0.025 | 1 | 0 |
| h[a2, 1] = ~a2 & a1 & a3 | 0.05 | 2 | 0 |
| h[a2, 2] = a1 & a3 | 0.05 | 1 | 0 |
| h[a3, 0] = (a1 | a2) & a3 | 0.075 | 1 | 1 |
| h[a3, 1] = 0 | 0 | 0 | 0 |
| h[a3, 2] = 0 | 0 | 0 | 0 |

As shown above in Table 11, the probabilities and the operational costs of the nine reductions may be generated on the level-2 function F_1(X) with respect to the level-1 cofactor D1_a. In one embodiment, the probability of each reduction may be multiplied by that of the cofactor D1_a which in the current embodiment is Pr(b)=Pr(b1 & b2)=Pr(b1)*Pr(b2) =0.2*0.5=0.1.

Additionally, among the reductions in Table 11, a subset of reductions that are non-inferior may be determined. For example, all non-inferior reductions of Table 11 are summarized in Table 12 below. It should be noted that the non-inferior reductions presented in Table 12 are set forth for illustrative purposes only, and thus should not be construed as limiting in any manner.

TABLE 12

| Reduction | Probability | # ANDs | # ORs |
|---|---|---|---|
| h[a1, 0] = a1 & a3 | 0.05 | 1 | 0 |
| h[a3, 0] = (a1 | a2) & a3 | 0.075 | 1 | 1 |
| h[a3, 1] = 0 | 0 | 0 | 0 |

As shown in Table 12, the first two reductions may have small probabilities. In one embodiment, it may be assumed that the more detailed power overhead data eventually shows that such small deactivation probability does not justify the respective operational cost. As a result, in one embodiment, it may be determined that the last reduction h[a3, 1]=0 is the optimal positive Shannon reduction for F_1(X) with respect to D1_a.

With respect to the negative Shannon reduction of F_1(X), the probability of the level-1 cofactor D1_a' may be computed as: Pr(D1_a')=Pr(c)=Pr(c1|c2)=Pr(c1)+Pr(c2)−Pr(c1)*Pr(c2)=0.5+0.8−0.5*0.8=0.9. Therefore, in one embodiment, any reduction of ~F_1(X) may need to be composed with D1_a', and as a result, its probability contribution may be multiplied by Pr(D1_a'), (in this scenario, 0.9).

Further, in the current embodiment, ~F_1(X) may be calculated as: ~F_1(X)=~((a1|a2) & a3)=(~a1 & ~a2)|~a3. Also, since ~F_1(X) has 3 variables (a1, a2 and a3), 3*3=9 reductions of ~F_1(X) may be considered, as summarized in Table 13 below. It should be noted that the non-inferior reductions presented in Table 13 are set forth for illustrative purposes only, and thus should not be construed as limiting in any manner.

TABLE 13

| Reduction | Probability | # ANDs | # ORs |
|---|---|---|---|
| h[a1, 0] = a1 & ~a3 | 0.45 | 1 | 0 |
| h[a1, 1] = ~a1 & (~a2 | ~a3) | 0.475 | 1 | 1 |
| h[a1, 2] = ~a3 | 0.9 | 0 | 0 |
| h[a2, 0] = a2 & ~a3 | 0.45 | 1 | 0 |
| h[a2, 1] = ~a2 & (~a1 | ~a3) | 0.475 | 1 | 1 |

TABLE 13-continued

| Reduction | Probability | # ANDs | # ORs |
|---|---|---|---|
| h[a2, 2] = ~a3 | 0.9 | 0 | 0 |
| h[a3, 0] = a3 & (~a1 & ~a2) | 0.025 | 2 | 0 |
| h[a3, 1] = ~a3 | 0.9 | 0 | 0 |
| h[a3, 2] = ~a1 & ~a2 | 0.25 | 1 | 0 |

As shown above in Table 13, the probabilities and the operational costs of the nine reductions may be generated on the level-2 function ~F_1(X) with respect to the level-1 cofactor D1_a'. In one embodiment, the probability of each reduction may be multiplied by that of the cofactor D1_a' which in the current embodiment is 0.1.

Also, as shown in operation 410, non-inferior reductions may be determined for each variable of the deactivation function. For example, among the reductions in Table 13, a subset of reductions that are non-inferior may be determined. For example, ~a3 may be determined to be the only non-inferior reduction in Table 13. In one embodiment, reductions of F_1(X) may need to be composed with the level-1 cofactor D_a through an AND operation, and as a result, the probability contribution of the reduction may have to be multiplied by Pr(D1_a). Similarly, in another embodiment, the total operational cost may have to account for that of D1_a and the AND operation for composing D1_a and F_1(x) together.

Therefore, in one embodiment, The probability of the level-1 cofactor D1_a may be: Pr(D1_a)=Pr(b)=Pr(b1 & b2)=Pr(b1)*Pr(b2)=0.2*0.5=0.1, and its operational cost for D1_a may be 1 AND. Additionally, The probability of the level-1 cofactor D1_a' may be: Pr(D1_a')=Pr(c)=Pr(c1|c2) =Pr(c1)+Pr(c2)−Pr(c1)*Pr(c2)=0.5+0.8−0.5*0.8=0.9, and its operational cost for D1_a may be 1 OR.

Table 14 below summarizes the combined probabilities and costs for the optimal positive and negative Shannon reduction of F_1(X). The optimal positive Shannon reduction for F_1(X), D1_a(Y) & h[a3, 1] may be simplified from the composition (a & D1_a(Y)) o (a==h[a3, 1]) by substituting level-1 variable a in the positive Shannon reduction a & D1_a(Y) with h[a3, 1]. Similarly, the optimal negative Shannon reduction for F_1(X), D1_a'(Y) & h[a1, 2] may be simplified from the composition (~a & D1_a'(Y)) o (a==~h[a3, 1]) by substituting level-1 variable a in the negative Shannon reduction ~a & D1_a(Y) with h[a1, 2]. Again, it should be noted that the optimal reductions presented in Table 14 are set forth for illustrative purposes only, and thus should not be construed as limiting in any manner.

TABLE 14

| Reduction | Probability | # ANDs | # ORs |
|---|---|---|---|
| D1_a(Y) & h[a3, 1] = 0 | 0.1 * 0 = 0 | 2 | 0 |
| D1_a'(Y) & h[a1, 2] = (c1 | c2) & ~a3 | 0.9 * 0.9 = 0.81 | 1 | 1 |

As shown in Table 14, the optimal positive Shannon reduction for F_1(X) (also known as the level-1 positive Shannon decomposition based reduction of D) has a probability of 0 but a cost of 2 AND operations. In one embodiment, it may be inferior to the "automatic" reduction of D to 0 because the latter also yields a probability of 0 but with no cost.

Additionally, in another embodiment, the universal quantification for F_1 may be determined. For example, the reduction corresponding to the universal quantification with respect to the level-1 variable a may calculated as D1_a(Y) & D1_a'(Y)=b & c. Additionally, in one embodiment, the probability of the universal quantification may be (0.1*0.9=0.09), and the universal quantification may have 1 AND and 1 OR.

In another embodiment, it may be determined that the above universal quantification reduction of D is inferior to the negative Shannon reduction for F_1, since the latter has a larger probability with the same operational cost. Therefore, among all three reductions with respect to level-1 variable a (the positive Shannon reduction, negative Shannon reduction, and universal quantification for F_1), the negative Shannon reduction may be determined to be the best.

Further, in yet another embodiment, in order to optimize the other two level-2 functions, F_2 and F_3, we apply the same procedure above as for F_1, and find the positive Shannon reduction, negative Shannon reduction, and universal quantification for each. For example, For F_2 (which corresponds to the level-1 variable b), the optimal reduction may be determined to be the universal reduction of D with respect to b. This result may be shown as c & ~a3=(c1|c2) & ~a3, which happens the same as the optimal reduction for F_1.

Additionally, for F_3 (which corresponds to the level-2 variable c), the optimal reduction may be determined to be the Positive Shannon component of D with respect to c composed with F_3 itself. This result may be shown as c & ~a3=(c1|c2) & ~a3, which is again the same as the optimal reduction for F_1. Further still, in one embodiment, the original deactivation function D itself (e.g., D1(Y) o (a==F_1(X))) may be considered without any reduction. As before, in the current embodiment, it is assumed that its variables are independent, and its probability is computed as 0.84, with 4 ANDs and 3 ORs.

Table 15 summarizes the results of the optimal deactivation function calculation. It should be noted that the results presented in Table 15 are set forth for illustrative purposes only, and thus should not be construed as limiting in any manner.

TABLE 15

| Reduction | Probability | # ANDs | # ORs |
|---|---|---|---|
| Negative Shannon reduction for F_1(X): (c1 \| c2) & ~a3 | 0.81 | 1 | 1 |
| No Reduction: D(X) | 0.84 | 4 | 3 |

Also, as shown in operation 412, an optimal reduction may be determined based on the non-inferior reductions for each variable of the deactivation function. For example, as shown in Table 15, the case where no reduction is made has a slightly larger probability (0.84 versus 0.81), but its operational cost is more than three times that of the negative Shannon reduction. In one embodiment, based on further data, including the actual power saving on the target module to be deactivated and the power needed for each AND and OR operations, it may be determined that the case where no reduction is made saves less power overall. That is, the first reduction, i.e., the negative Shannon reduction is optimal. Therefore, the optimal reduction of D may be determined to be (c1|c2) & ~a3.

Table 16 illustrates a general deactivation function optimization by invoking a basic method or a hierarchical method based on the complexity of the problem. In one embodiment, the hierarchical method may decompose the problem into smaller ones and call procedure OPTIMIZE on the smaller problems. Therefore, procedure OPTIMIZE may be recursive in nature. It should be noted that the general deactivation function optimization presented in Table 16 is set forth for illustrative purposes only, and thus should not be construed as limiting in any manner.

TABLE 16

```
Procedure OPTIMIZE
Input:
    C: A circuit C;
    M: A component M of C;
    D: A legal deactivation function for M;
    SA: Relevant signal SA values of C.
Output:
    D*: A deactivation function of M which is a sub-function
        of D that minimizes the power consumption of C.
Line
1   if {Complexity(D) unsuitable for basic method}
2       D* := OPTIMIZE_HIERARCHICAL(C, M, D, SA);
3   else
4       D* := OPTIMIZE_BASIC(C, M, D, SA);
5   return D*;
```

Table 17 illustrates a hierarchical deactivation function optimization. For example, in line 1, the input deactivation function D may be rewritten into a 2-level function. In another example, Level 1 (in one embodiment, the root level) may be a function D1 with m auxiliary variables, y_1, . . . , y_m. Additionally, Level 2 (in one embodiment, leaf levels) may define m functions F_1, . . . , F_m, with F_i specifying the function of y_i in terms of supports of D, for i=1, . . . , m. Further, the operator o may denote functional composition. In one embodiment, D1 may be simple enough for the basic method. In another embodiment, after rewriting, functions D1, F_1, . . . , F_m may all be simpler (e.g., contain fewer variables, operators, etc.) than D. It should be noted that the iterative reduction presented in Table 17 is set forth for illustrative purposes only, and thus should not be construed as limiting in any manner.

TABLE 17

```
Procedure OPTIMIZE_HIERARCHICAL
Input:
    C: A circuit C;
    M: A component M of C;
    D(X): A legal deactivation function for M;
    SA: Relevant signal SA values of C.
Output:
    D*: A deactivation function of M which is a sub-function of D that
        minimizes the power consumption of C.
Line
1       rewrite D as D1(y_1, ..., y_m) o (y_1 == F_1(X)) o ... o
        (y_m == F m(X)) for some integer m s.t. D1 is simpler than D;
2       Y := {y_1, ..., y_m}; P_orig := Pow(C + D);
3       for i = 1, ..., m
4       begin
5           Compute D1_y_i, the positive cofactor of D1 w.r.t. y_i;
6           Compute D1_y_i', the negative cofactor of D1 w.r.t. y_i;
7           F*_i := OPTIMIZE(C, M + D1_y_i, F_i(X), SA);
8           F*_i' := OPTIMIZE(C, M + D1_y_i', ~F_i(X), SA);
9           h[i, 1] := ( y_i & D1_y_i(Y)) o (y_i == F*_i(X));
10          h[i, 2] := (~y_i' & D1_y_i'(Y)) o (y_i == ~F*_i'(X));
11          h[i, 3] := D1_y_i(Y) & D1_y_i'(Y);
12          P_min := P_orig; optimal_comp_id[i] := 0;
13          for j = 1, ..., 3
14          begin
15              if {Pow(C + h[i, j]) < P_min}
16              begin
17                  P_min := Pow(C + h[i, j]);
18                  optimal_comp_id[i] := j;
19              end
20          end
21          if {optimal_comp_id[i] == 1}
22              optimal_reduction[i] := F*_i;
23          else if {optimal_comp_id[i] == 2}
24              optimal_reduction[i] := F*_i;
25      end
26      Let D* := D1;
27      for i = 1, ..., m
28          if {optimal_comp id[i] == 3}
```

TABLE 17-continued

```
29          D* := D*_y_i & D*_y_i';
30          for i = 1, ..., m
31              if {optimal_comp_id[i] == 1)
32                  D* := ( y_i & D*_y_i) o (y_i == optimal_reduction[i]);
33              else if {optimal_comp_id[i] == 2)
34                  D* := (~y_i & D*_y_i') o (y_i == optimal_reduction[i]);
35          D* := OPTIMIZE(C, M, D*, SA);
36          return D*;
```

In one embodiment, a deactivation function D may be rewritten in multiple ways. For instance, D may be expressed in disjunctive normal form (DNF) as a disjunction of productive clauses, and the productive clauses may be partitioned into m groups for some positive integer m. The disjunction of the clauses in the i-th group may be assigned as function F_i, for i=1, ..., m. Then D1 is simply (y_1+ ... +y_m).

As another example, D may be expressed as a rooted directed acyclic graph (DAG) with its vertices and edges corresponding to logic operations and signals, respectively. Each of the leaf vertices may correspond to a distinct support variable of D. The root vertex may correspond to D itself. In that case, the DAG may be bi-partitioned by an edge cut set Y. In one embodiment, suppose Y has m edges, y_1, ..., y_m, for some integer m. The first part, from Y to the root again may be a rooted DAG, and may be assigned as function D1. For example, D1 may be noted as the level-1 function. The second part, from the cut set Y to the leaves, may have m possibly overlapping DAGs rooted at y_1, ..., y_m, respectively. In one embodiment, the functions of these m DAGs may be F_1, ..., F_m, respectively. For example, these m functions may be noted as the level-2 functions. Further, in another embodiment, the cut set Y may be chosen arbitrarily. However, the first DAG corresponding to D1 may be small enough for the basic method. In another embodiment, it may not be required for D1 to be unate.

Also, in yet another embodiment, variations for the rewriting of D into a 2-level function may be possible. For example, the choice of a rewriting approach in line 1 of the procedure may be made to suit a specific application.

In one example, let Y denote a set of m support variables of D1, y_1 through y_m (line 2). In Line 2, the power of the design if the original deactivation logic D were to be applied is computed, and the result is stored in variable P_orig. Additionally, the level-2 functions, F_1, ..., F_m are then optimized (lines 3 to 25). After that, the optimized level-2 functions are combined with D1 accordingly (lines 26 to 34). In one embodiment, the combined function may be verified as a legal reduction of the input function D. Finally, it calls the procedure OPTIMIZE (see Table 16) on the combined function (line 35) and returns the resulting function (line 36).

In another embodiment, because the level-1 function D1 may not necessarily be unate, a legal reduction of a level-2 function F_i may not yield a legal reduction of D when it is composed with D1 through the corresponding variable y_i. To address this, an observation is made that a legal reduction of F_i yields a legal reduction of D if it is composed with the positive cofactor of D1 with respect to y_i. Similarly, a legal reduction of ~F_i yields a legal reduction of D if it is composed with the negative cofactor of D1 with respect to y_i.

Further, lines 3 to 25 iterate through support variables of D1, y_1, ..., y_m, and optimize their corresponding level-2 functions. For variable y_i, line 5 computes the positive cofactor of D1 with respect to y_i, denoted by D1_y_i. Line 6 computes the negative cofactor of D1 with respect to y_i, denoted by D1_y_i'. In line 7, the level-2 function F_i is optimized by calling the procedure OPTIMIZE (see Table 16). In one embodiment, the target module passed to the OPTIMIZE call is M+D1_y_i instead of M. Recall that M is the target component to deactivate as an input of the procedure. M+D1_y_i refers to the fact that the optimized level-2 function F_i is going to be composed with D1_y_i to deactivate M. By passing M+D_1_y_i as the deactivation target, the procedure OPTIMIZE is instructed to properly account for this decomposition of the deactivation logic. The resulting function is assigned to F*_i. Similarly, line 8 optimizes the negated level-2 function ~F_i by calling the procedure OPTIMIZE where the target deactivation component is M+D1_y_i'. The resulting function is assigned to F*_i'.

Further still, as shown, line 9 constructs the first Shannon reduction by composing the positive Shannon reduction of D1 with respect to y_i and the optimized level-2 function F*_i. The resulting reduction is denoted by h[i, 1]. Additionally, line 10 constructs the second Shannon reduction by composing the negative Shannon reduction of D1 with respect to y_i and the optimized level-2 function F*_i'. The resulting component is denoted by h[i, 2]. Also, line 11 constructs the universal quantification by taking the conjunction of the two cofactors of D1 with respect to y_i. The resulting component is denoted by h[i, 3]. In the context of the current embodiment, y_i may no longer be an essential support of h[i, 3].

In addition, lines 12 through 20 evaluate the above three reductions, h[i, j] (j=1, 2 and 3). The index of the best reduction is stored in the optimal component index array optimal_comp_id[i] which is initialized to 0 in Line 12. Note that only if a reduction results in smaller power consumption do we update the best component index array. As shown in line 21 through 24, the best component is stored in optimal_reduction[i].

Further, the optimal Shannon components may be combined to yield an optimal reduction of D, denoted by D*. For example, initially D* is assigned as D1 (line 26). Line 27 through 29 iteratively eliminates all supports of D1 from D* whose optimal reductions of their respective level-2 functions are universal quantifications. The elimination is done by universal quantification (line 29). Line 30 through 34 iteratively compose D* with the remaining supports of D1 with their respective optimal reductions computed earlier. Finally, line 35 optimizes the resulting function D* by calling the procedure OPTIMIZE. Line 36 returns the final optimized result.

Many variations of the above described procedure may be possible without departing from the spirit of the method. For instance, instead of applying the optimal reduction to each of the level-2 functions (lines 26 through 34), the optimal reductions may be applied to any number of the level-2 functions that yield a larger power savings. The resulting optimal reduction D* may then be optimized through the procedure OPTIMIZE same as in line 35. In this matter, the overall optimization may yield more power savings.

Figure 5:
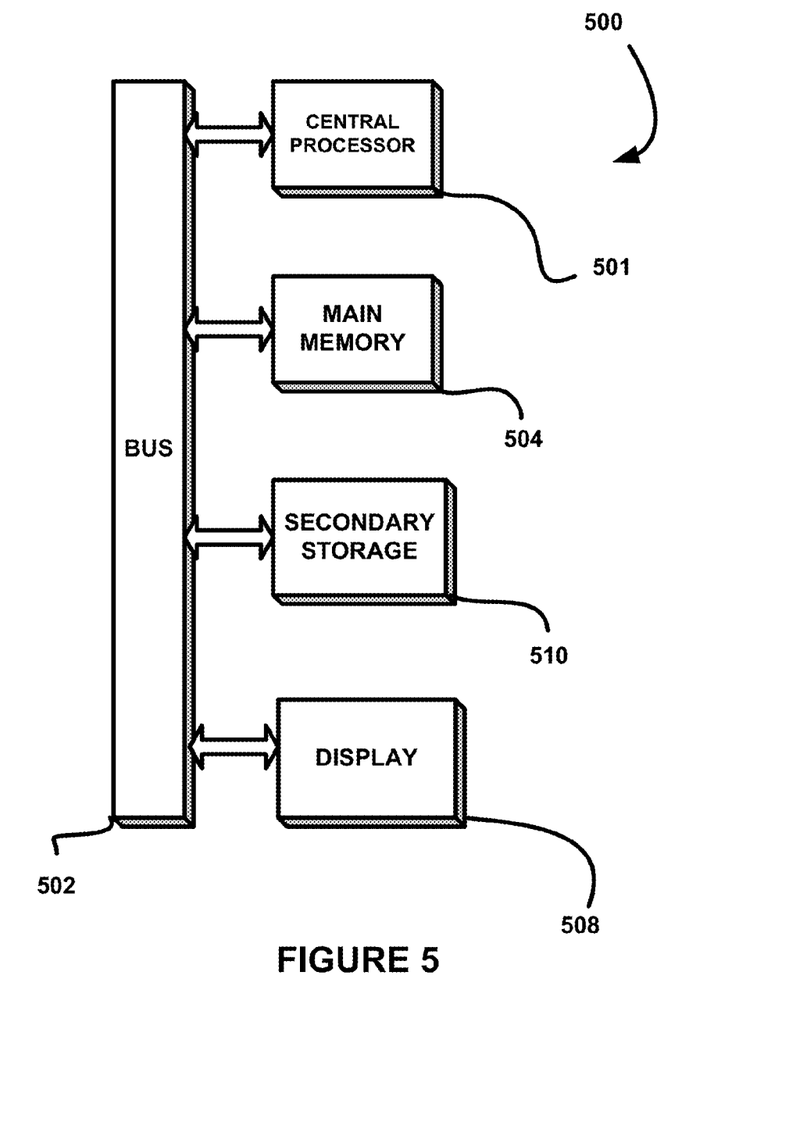
FIG. 5 illustrates an exemplary system, in accordance with one embodiment.

FIG. 5 illustrates an exemplary system 500 with which the various features of FIGS. 1-4 may be implemented, in accordance with one embodiment. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a display 508.

The system 500 may also include a secondary storage 510. The secondary storage 510 includes, for example, a hard disk drive and/or a removable storage drive, representing a floppy disk drive, a magnetic tape drive, a compact disk drive, etc.

The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions. Memory 504, storage 510 and/or any other storage are possible examples of computer-readable media.

In one embodiment, such computer programs may be used to carry out the functionality of the previous figures. Further, in other embodiments, the architecture and/or functionality of the various previous figures may be implemented utilizing the host processor 501, a chipset (i.e. a group of integrated circuits designed to work and sold as a unit for performing related functions, etc.), and/or any other integrated circuit for that matter.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. One or more non-transitory computer-readable media storing instructions that, when executed by a computer, cause the computer to perform a method of reducing power consumption in a logic circuit, the method comprising:
   identifying a deactivation logic function that specifies conditions for deactivating one or more components in a logic circuit, the deactivation logic function having a plurality of variables;
   calculating a plurality of reductions for the deactivation logic function, each of the plurality of reductions eliminating at least one of the plurality of variables from the deactivation logic function;
   identifying a preferred reduction of the calculated reductions based on at least one of an implementation cost of a respective reduction or a probability that the respective reduction evaluates to true; and
   substituting the preferred reduction for the deactivation logic function to form a new deactivation logic function.

2. The computer-readable media of claim 1, wherein the deactivation logic function is a decomposition of another deactivation logic function.

3. The computer-readable media of claim 1, wherein the plurality of variables represent inputs.

4. The computer-readable media of claim 1, wherein the plurality of variables represent support functions.

5. The computer-readable media of claim 4, wherein the method further comprises determining a preferred reduction of the support functions represented by the plurality of variables prior to determining the preferred reduction of the deactivation logic function.

6. The computer-readable media of claim 5, wherein an initial preferred reduction of the support functions is determined prior to determining the preferred reduction of the support functions.

7. The computer-readable media of claim 4, wherein each support function includes one or more support function variables.

8. The computer-readable media of claim 1, wherein the reductions of the deactivation logic function are calculated with respect to each of the plurality of variables.

9. The computer-readable media of claim 1, wherein the plurality of reductions of the deactivation logic function include a positive Shannon reduction, a negative Shannon reduction, and a universal quantification for the deactivation logic function with respect to each of the plurality of variables.

10. The computer-readable media of claim 9, wherein the positive Shannon reduction for the deactivation logic function with respect to a particular variable is determined utilizing the particular variable and a positive co-factor of the deactivation logic function with respect to the particular variable.

11. The computer-readable media of claim 9, wherein the negative Shannon reduction for the deactivation logic function with respect to a particular variable is determined utilizing a negation of the particular variable and a negative co-factor of the deactivation logic function with respect to the particular variable.

12. The computer-readable media of claim 1, wherein the method further comprises:
   calculating additional reductions for the new deactivation logic function;
   determining a second preferred reduction of the additional reductions; and
   substituting the second preferred reduction to form a second new deactivation logic function.

13. The computer-readable media of claim 1, wherein the probability that the reductions are equal to true is determined using switching activity values of one or more signals in the logic circuit.

14. The computer-readable media of claim 1, wherein the cost of implementation comprises at least one of a power overhead, a component area overhead, or a speed overhead.

15. A method executed by a computing device, the method comprising:
   identifying a deactivation logic function that specifies conditions for deactivating one or more components in a logic circuit, the deactivation logic function having a plurality of variables;
   calculating a plurality of reductions for the deactivation logic function, each of the plurality of reductions eliminating at least one of the plurality of variables from the deactivation logic function;
   identifying a preferred reduction of the calculated reductions that has at least one of the lowest implementation cost of the plurality of reductions or the highest probability of evaluating to true; and
   reducing the deactivation logic function by substituting the preferred reduction for the deactivation logic function.

16. The method of claim 15, wherein the plurality of reductions for the deactivation logic function include a positive Shannon reduction, a negative Shannon reduction, and a universal quantification for the deactivation logic function with respect to each of the plurality of variables.

17. The method of claim 15, wherein the plurality of reductions of the deactivation logic function are calculated with respect to each of the plurality of variables.

18. The method of claim 15, wherein the plurality of variables represent support functions.

19. The method of claim 18, further comprising determining a preferred reduction of the support functions represented by the plurality of variables prior to identifying the preferred reduction of the deactivation logic function.

20. The method of claim 19, wherein an initial preferred reduction of the support functions is determined prior to determining the preferred reduction of the support functions.

21. The method of claim 18, wherein each support function includes one or more support function variables.

22. The method of claim 15, wherein the probability of evaluating to true is determined using switching activity values of one or more signals in the logic circuit, and wherein the implementation cost comprises at least one of a power overhead, a component area overhead, or a speed overhead.

23. The method of claim 15, further comprising:
calculating additional reductions for the preferred reduction;
determining a second preferred reduction of the additional reductions; and
substituting the second preferred reduction for the preferred reduction.

24. A computer-implemented method executed by a computer, the method comprising:
identifying a deactivation logic function that specifies conditions for deactivating one or more components in a logic circuit, the deactivation logic function having a plurality of variables;
calculating a plurality of reductions for the deactivation logic function with respect to each of the plurality of variables;
forming a set of possible reductions by identifying unique reductions from the calculated plurality of reductions;
identifying a preferred reduction from the set of possible reductions based on an implementation cost or a probability of evaluating to true; and
reducing the deactivation logic function to the preferred reduction.

25. The computer-implemented method of claim 24, wherein the plurality of reductions for the deactivation logic function calculated with respect to each of the plurality of variables includes a positive Shannon reduction, a negative Shannon reduction, or a universal quantification.

26. The computer-implemented method of claim 24, wherein the plurality of variables represent support functions.

27. The computer-implemented method of claim 26, further comprising determining a preferred reduction of the support functions represented by the plurality of variables prior to identifying the preferred reduction of the deactivation logic function.

28. The computer-implemented method of claim 27, wherein an initial preferred reduction of the support functions is determined prior to determining the preferred reduction of the support functions.

29. The computer-implemented method of claim 26, wherein each support function includes one or more support function variables.

30. The computer-implemented method of claim 24, wherein the probability of evaluating to true is determined using switching activity values of one or more signals in the logic circuit, and wherein the implementation cost comprises at least one of a power overhead, a component area overhead, or a speed overhead.

31. The computer-implemented method of claim 24, further comprising:
calculating additional reductions for the preferred reduction;
determining a second preferred reduction of the additional reductions; and
substituting the second preferred reduction for the preferred reduction.

* * * * *